United States Patent [19]

Siemon et al.

[11] Patent Number: 5,412,751
[45] Date of Patent: May 2, 1995

[54] RETROFITTABLE MULTIMEDIA PATCH MANAGEMENT SYSTEM

[75] Inventors: John Siemon, Woodbury; Robert Carlson, Torrington; Randy Below, Cheshire, all of Conn.

[73] Assignee: The Siemon Company, Watertown, Conn.

[21] Appl. No.: 114,585

[22] Filed: Aug. 31, 1993

[51] Int. Cl.⁶ .............................................. G02B 6/26
[52] U.S. Cl. .................................. 385/135; 385/136; 385/137; 439/552
[58] Field of Search ............... 385/135, 134, 136, 137, 385/147, 115, 139, 138; 439/552, 567, 571, 572

[56] References Cited

U.S. PATENT DOCUMENTS

| | | | |
|---|---|---|---|
| 5,052,775 | 10/1991 | Bossard et al. | 385/135 X |
| 5,067,784 | 11/1991 | Debortoli et al. | 385/135 X |
| 5,127,082 | 6/1992 | Below et al. | 385/135 |
| 5,167,001 | 11/1992 | Debortoli et al. | 385/135 |
| 5,212,761 | 5/1993 | Petrunia | 385/135 |

Primary Examiner—Rodney B. Bovernick
Assistant Examiner—Phan Thi Heartney
Attorney, Agent, or Firm—Fishman, Dionne & Cantor

[57] ABSTRACT

A fiber optic patch panel for use with fiber optic or other cables is presented. The patch panel includes a fiber management tray, a front connector panel having a plurality of laterally spaced rectangular ports and a pair of mounting slots extending laterally therefrom, a pair of sides extending perpendicularly from the tray along a portion of each lateral edge of the tray, and a back also extending perpendicularly from the tray and along a portion of the back edge. Disposed within the rectangular ports of the front connector panel are modular connector assemblies. A cover may be employed to protect fibers and prevent dust and the like from being deposited and collecting within the tray. A splice tray, which is releasably fastened to the management tray, may also be employed for splicing fiber optic strands.

24 Claims, 5 Drawing Sheets

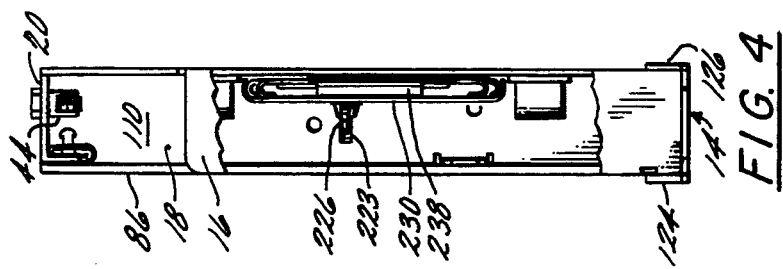
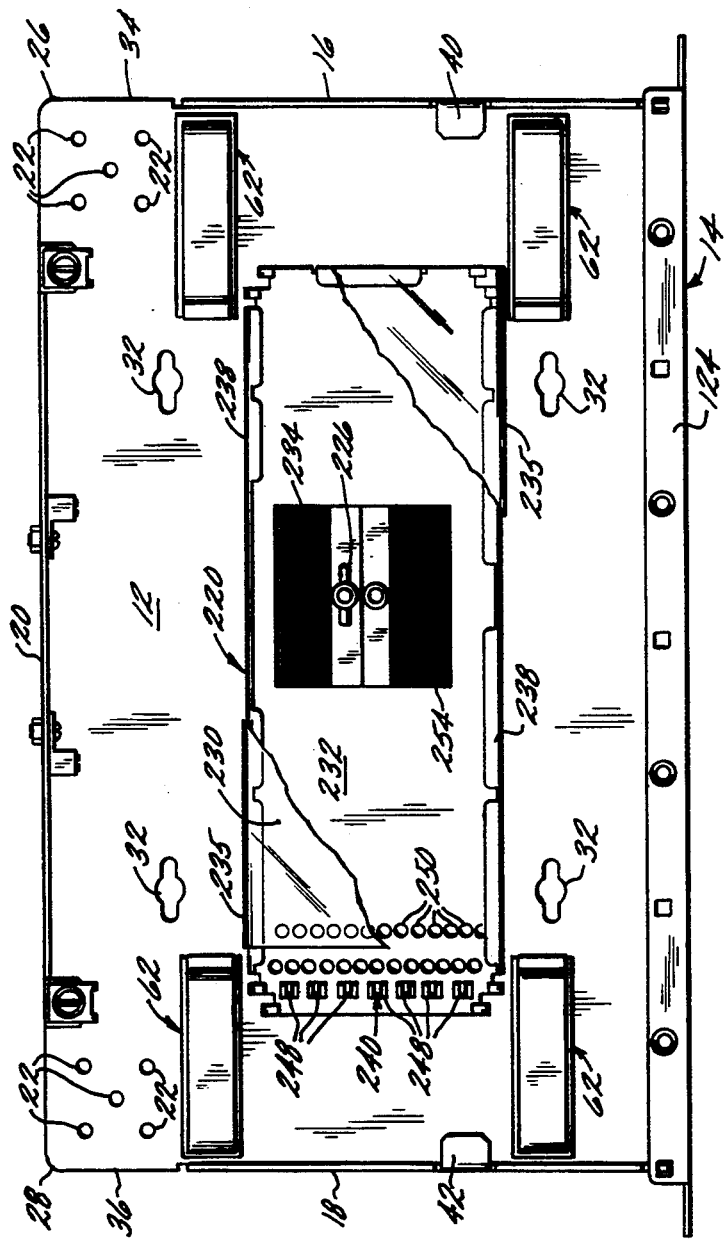
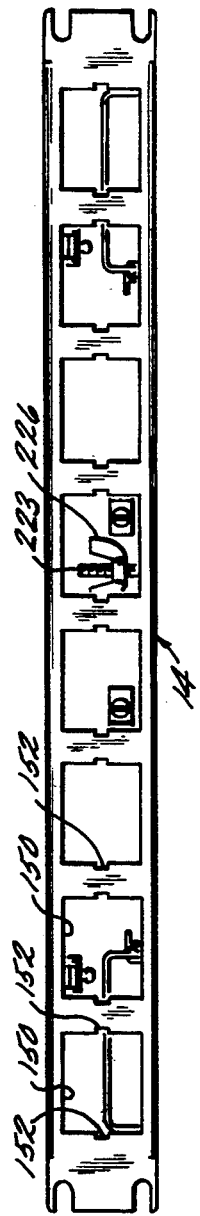

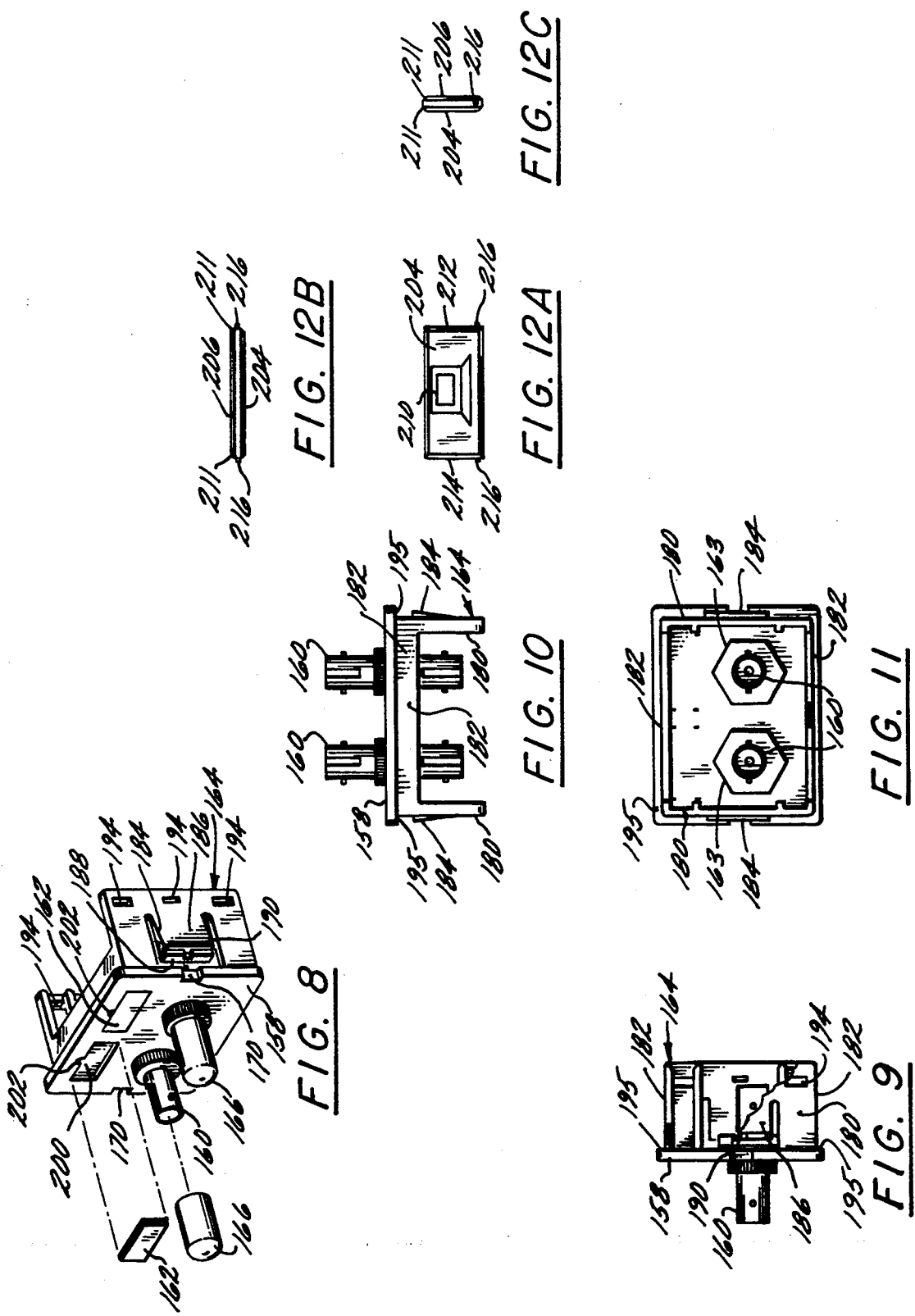

RETROFITTABLE MULTIMEDIA PATCH MANAGEMENT SYSTEM

BACKGROUND OF THE INVENTION

This invention relates generally to the field of fiber optics and, more particularly, to devices for interconnecting optical fibers or other similar telecommunications cables.

Prior art patch panels typically include an enclosure, a tray, slidably received within the enclosure for storing cable, and a connector panel, mounted on the tray, for supporting fiber optic connectors associated with the cables. Fiber optic patch panels provide an interface between incoming fiber optic cables and optoelectronic equipment, provide access to an organized array of fibers and fiber connections, and facilitate splicing of optical fibers and testing of the fiber optic system.

Various problems arise in connection with prior art patch panels. For example, previous fiber optic patch panels provide no means for designating service or destination of connected fiber optic cables other than conventional labels that detract from product aesthetics and are difficult to revise as installation changes are made. U.S. Pat. No. 5,127,082 to Below et al, which is assigned to the assignee hereof and incorporated herein by reference, discloses a tray including label retention ribs for retaining an elongated label. However, while the tray of U.S. Pat. No. 5,127,082 is well suited for its intended purposes, this elongated label is still displayed on the outside detracting from product aesthetics and requires changing the entire elongated label for many connectors when only one connector label needs to be replaced.

Prior art patch panels lack an effective means for introduction of fiber optic cables onto the tray for preventing the inadvertent bending of the cables into tight radii which is known to have detrimental effects on optical fiber transmission properties and which may damage expensive cable assemblies. The prior art patch panels also lack a means for locating and splicing fiber optic cables on the tray itself. Users have a need for an easy access to a device for splicing fiber optic cables located on the tray. Without proper cable management of cables, spliced cables etc., cable identification becomes difficult and prone to error that may result in accidental disconnection of active devices and/or inadvertent movement or disturbance of nearby connections.

SUMMARY OF THE INVENTION

The above-discussed and other drawbacks and deficiencies of the prior art are overcome or alleviated by the present invention. In accordance with the present invention, a telecommunication cable patch panel is presented with the panel including a management tray and a front connector panel. The tray includes means for receiving and coiling fibers, opposing sides and a back. The sides are disposed along a portion of the tray and together with the back, which is also disposed along a portion of the tray, define apertures for the receipt of cables and the like therethrough. Means for receiving and coiling fibers includes a clamp and a plurality of clips spaced along a surface of the tray. A cover may also be employed which preferably engages a series of tabs located on the upper edges of the sides and back of the tray.

The front connector panel is mounted at the front of the management tray and includes means for mounting to the tray, means for mounting to a rack and a plurality of laterally spaced slots disposed therethrough. Modular connector assemblies, which are disposed within these slots, include a yoke panel and a pair of fiber optic connectors. The fiber optic connectors may be any suitable type for interconnecting optical cables and are mounted transverse to an outer face of the yoke panel. Means for mounting the yoke panels extends outwardly from a rear surface of the panel and are constructed to snaplockedly mate with the slots of the front panel. An individual labeling means for each fiber optic connector is also provided. The labeling means includes a recess in the panel wherein an insert having a symbol disposed thereon may be snaplockedly secured therein. Alternatively, the labeling means may comprise clear tabs used in connection with white or other colored labels.

A splice tray may also be provided with the fiber optic patch panel and the tray is preferably releasably fastened to the management tray. The splice tray includes a base having a cable receiving portion and a mechanical or fusion cable splicing unit mounted thereon. The cable receiving portion includes flanges for engaging the outer sheath of an optical cable. The cable splicing unit is preferably centrally mounted on the base for ensuring that optic cables lay at a proper curvature to thereby prevent excessive bends therein which, it will be appreciated, are undesirable.

While the present invention will be described in connection with the use of fiber optic cables, it will be appreciated that the patch panel of this invention is similarly useful with other telecommunications cables including, for example, wire (copper) such as shielded and unshielded twisted pair.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES:

FIG. 2 is a plan view of a fiber optic patch panel in accordance with the present invention including a fiber splice tray having a top portion partially broken away;

FIG. 3 is a front view of the device of FIG. 2;

FIG. 4 is a side view of the device of FIG. 2 having a side portion partially broken away;

FIG. 8 is an exploded view, in perspective, of a connector assembly in accordance with the present invention;

FIG. 9 is a side view, partially broken away, of the connector assembly of FIG. 8;

FIG. 10 is a top view of the connector assembly of FIG. 8;

FIG. 11 is a rear view of the connector assembly of FIG. 8;

FIG. 12A is a front view of a snap-in designation tab in accordance with the present invention;

FIG. 12B is a top view of the tab of FIG. 12A;

FIG. 12C is a side view of the tab of FIG. 12A;

DESCRIPTION OF THE PREFERRED EMBODIMENT

As mentioned, the telecommunications cable patch panel of this invention is well suited for managing any number of telecommunications cable including fiber optic cable and wire cables such as shielded and unshielded twisted cables. However, for ease of description, this invention will be described in connection with fiber optic cable.

Figure 1:
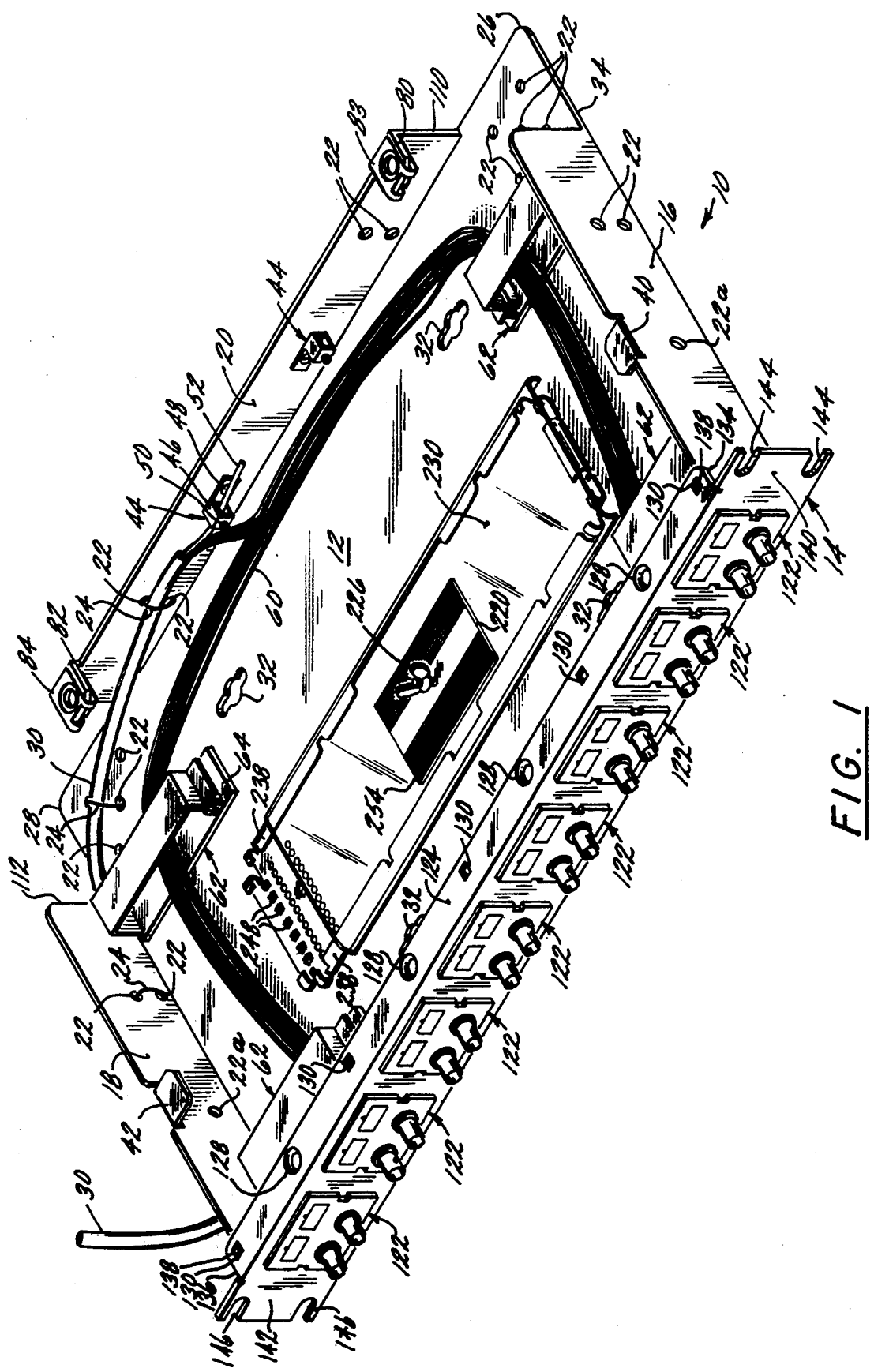
FIG. 1 is a perspective view of a fiber optic patch panel or management tray in accordance with the present invention omitting a cover.

Referring first to FIG. 1, a fiber optic patch panel in accordance with the present invention is shown generally at 10. The patch panel 10 includes a tray 12 and a front connector panel 14 fastened thereto. The tray 12 may be formed of any suitable material, although it is preferably formed of a metallic substance, e.g. aluminum. Tray 12 is also preferably flat and generally thin in cross-section and includes a pair of side walls 16 and 18, and a back 20. A plurality of apertures 22 are disposed through the tray 12 for the convenience of mounting cable ties 24 thereto. Referring also to FIG. 2, apertures 22 are located near rear corners 26 and 28 and are preferably provided in a pattern of five for mounting of cable ties 24 at any suitable angle depending upon the direction of incoming fiber optic cables 30. Wall mounting slots 32 are provided and are spaced advantageously on the tray 12.

Side walls 16 and 18 are preferably formed integrally with the tray 12 and also include apertures 22 for the receipt of cable ties 24. Side walls 16 and 18 extend upwardly from and along a portion of edges 34 and 36 of the tray 12. Tabs 40 and 42 are provided on each side wall for supporting a cover which will be discussed hereinafter.

Referring to FIG. 2, rear wall 20 is also preferably formed integrally with the tray 12 and extends upwardly therefrom. Apertures 22 are provided for securing optic cable 30 via cable ties 24 as previously discussed. Strain relief lugs 44 are disposed along rear wall 20 and each function to affix a metallic or dielectric strength member 52 of fiber optic cable 30 to provide strain relief and to prevent inadvertent movement thereof. In addition to providing strain relief for cable strength members, lugs 44 perform the important function of providing a ground path to tray 12, which is electrically continuous with from panel 14. The electrical connection between metallic strength members or drain wires and the ground lug allows multiple incoming cables to be maintained at the same reference potential (preferably zero volts relative to building ground) and allows them to be bonded directly to building ground when panel assembly 10 is mounted to a grounded frame. Lugs 44 include a housing 46, a fastener 48 and a compression screw 50. An inner support member 52 of the cable 30 is threaded through the housing 46 so that it may be compressed by the threaded screw 50. The location of lugs 44 is preferably along the rear wall 20 or side walls 16 and 18 (not shown) as it will be appreciated provides for proper cable management and prevents the excessive bending of the cable 30. Mounting of lugs 44 to side walls 16 and 18 may be accomplished using aperture 22a.

Figure 6:
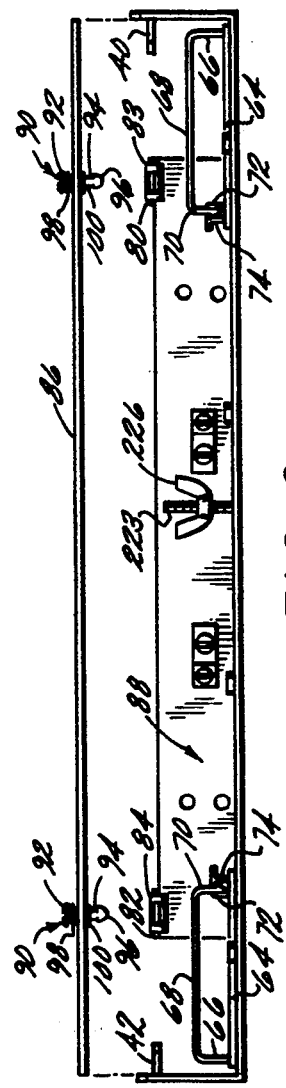
FIG. 6 is a front view of the device of FIG. 5, including an exploded cover.

Located on the tray 12 is a bundle of coiled optical fibers 60 which extend from the cable 30. The coiled optical fibers 60 are retained within cable retention clips 62. Referring now to FIGS. 1 and 6, cable retention clips 62 each include a base 64, a fixed side wall 66 secured to the base 64, a top 68 hingeably secured to side wall 66 and a ridged tab 70 secured to the top 68 and shaped to snaplock the top 68 between a pair of projections 72 and 74 extending from the base 64. The cable retention clips 62 function to maintain the coiled fibers 60 within a predetermined range of bending radii.

Figure 7:
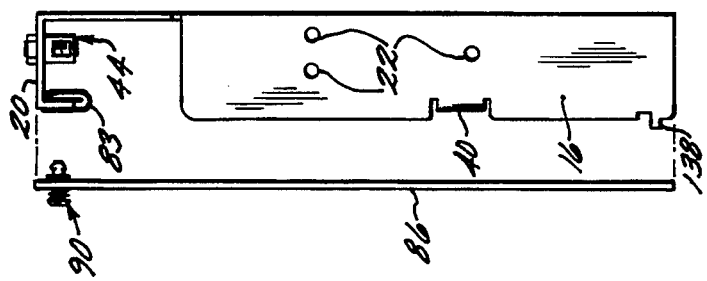
FIG. 7 is a side view of the device of FIG. 5 including an exploded cover.

A pair of tabs 80 and 82 are disposed on the upper portion of rear wall 20 and disposed thereon are a pair of receptacle clips 83 and 84. Referring to FIGS. 1, 6 and 7, a cover 86 for the tray 12 is illustrated. The cover is preferably formed of a transport plastic, e.g. polycarbonate and is structured to provide easy access to an interior cavity 88 which is defined by the tray 12, front connector panel 14, side walls 16 and 18 and rear wall 20. To facilitate easy removal of the cover 86, a pair of fasteners 90 are provided. The fasteners 90 include a head 92, a tubular section 94 and a flattened portion 96 and are disposed through an aperture (not shown) located in the cover 86. A spring 98 is provided between the cover 86 and the head 92 and a snap ring 100, which functions to hold the fastener 90 onto the cover 86, is disposed between the cover and the flattened portion 96. The flattened portion 96 of the fastener 90 is shaped to mate with a slot (not shown) in the receptacle clips 83 and 84. Upon insertion of the flattened portion 96 into the receptacle and rotation of a one fourth turn thereof, the fasteners 90 will be retained by the receptacle clips 83 and 84 to the tray 12. When mounted, the cover 86 is supported by tabs 40, 42, 80 and 82.

In accordance with an important feature of the present invention, side walls 16 and 18, rear wall 20 and cover 86 define a pair of openings 110 and 112 which are provided for receiving cables 30 therethrough. As best seen in FIGS. 1, 4 and 7, openings 110 and 112 are disposed at rear corners 26 and 28 and provide access for cables 30. Cable 30 may enter the tray 12 from a variety of directions without, it will be appreciated, excessively bending. As previously discussed, apertures 22 are provided for mounting cable ties 24 therethrough to retain the cable 30 on the tray 12.

Figure 13B:
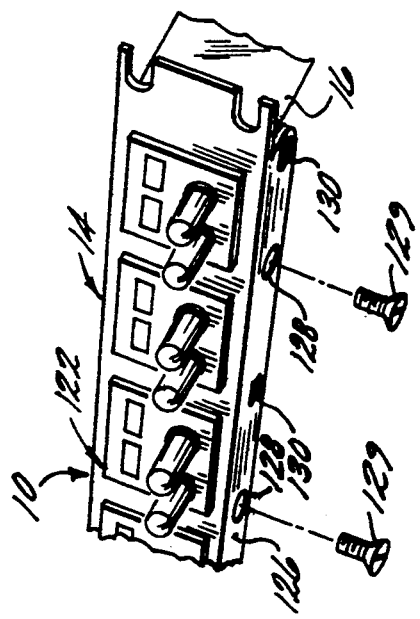
FIGS. 13A and 13B are sequential perspective views depicting assembly of the front connector panel to the management tray.
Figure 13A:
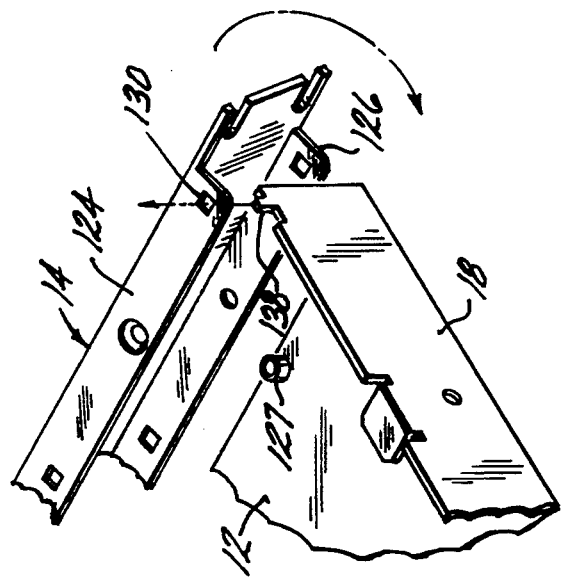

The front connector panel 14 is preferably fastened to the tray 12 and includes a plurality of connector assemblies 122. Panel 14 is preferably formed of the same material as the tray 12 and includes upper flange 124 and a lower flange 126. The upper flange 124 and the lower flange 126 each have several conical shaped apertures 128 and several rectangular shaped apertures 130. Both flanges are identical for the purpose of providing for easy assembly of the front connector panel 14 to the tray 12. As shown in FIGS. 13A and 13B, in mounting the connector panel 14 to the tray 12, rectangular apertures 130 disposed at the outer most ends 134 and 136 of upper flange 124 are provided for engaging projections 138 which extend from the upper edge of side walls 16 and 18 for attaching the front connector panel 14 to the tray 12. During assembly, tray 12 is rotated into place with tabs 138 engaged in apertures 130 until front edge of tray 12 and sidewalls 16 and 18 rest on the rear surface of panel 14.

The weight of tray 12 and its contents generates a moment area such that a constant static force is applied between tray 12 and front panel 14. This force assures that they are fixedly secured relative to each other when mounted on an equipment rack.

The ability of this product to be assembled to rack mounted panels without fastening hardware or special tools is an important feature of this invention because it allows for the addition of fiber capability to panels that were only partially populated with couplers used to support other cable types.

The most important aspect of the ability of the product to be assembled to rack mounted panels is retrofittability as is shown in the drawings. The rack mounted panels contemplated and shown, are convention CT panels. Thus, where CT panels exist in an installation which is being converted to fiberoptic cable or simply modified so that support/management trays are required for other communications cable, the tray of the invention is retrofittable to these existing CT panels. The ability to retrofit the tray arrangement to existing CT panels effectively lowers cost to customers who are modifying their telecommunications systems.

Figure 5:
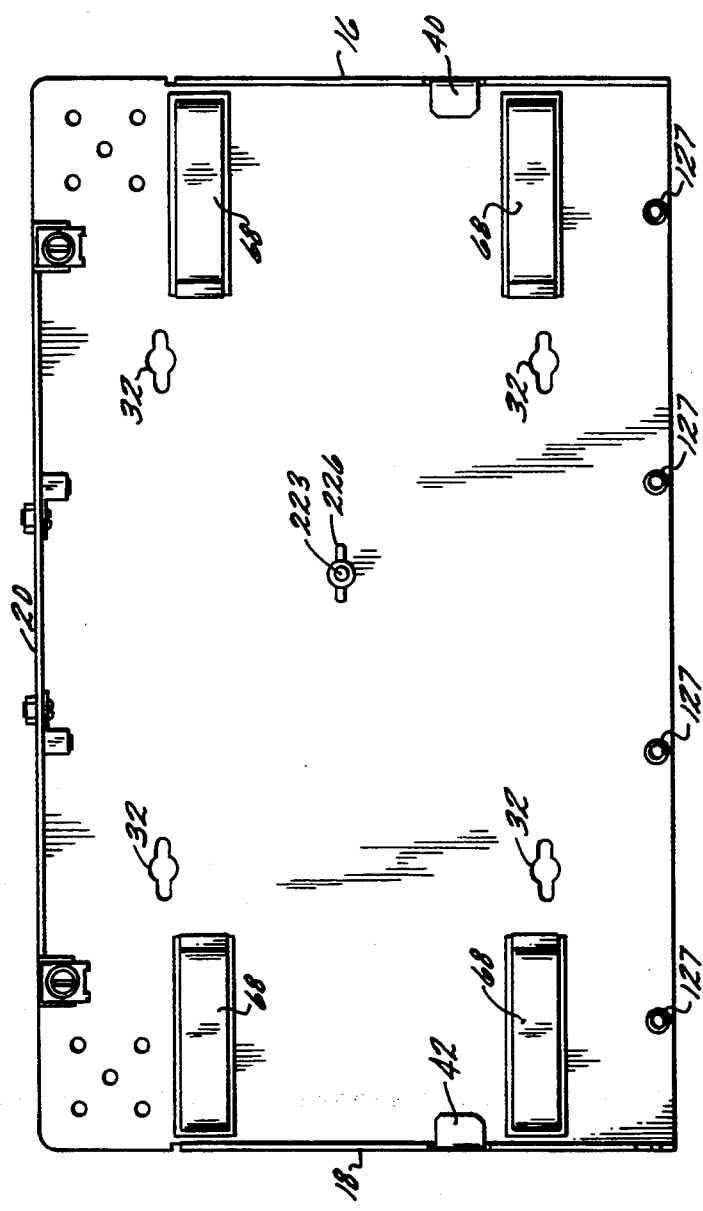
FIG. 5 is a plan view of a tray in accordance with the present invention.
Figure 14:
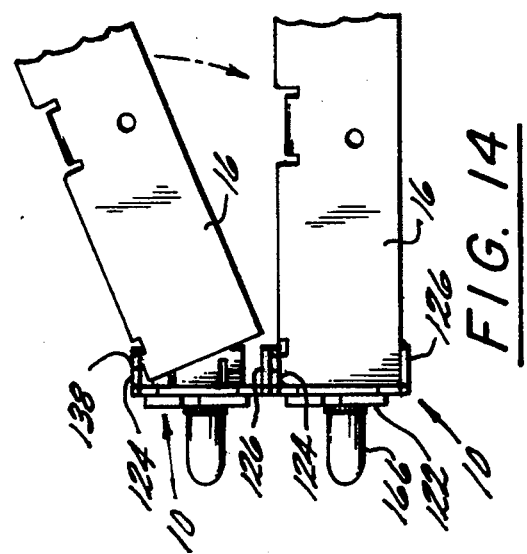
FIG. 14 is a side elevation view depicting assembly of a management tray to a previously installed patch panel.

For instances when tray 12 is not mounted on an equipment rack such as shown in FIG. 14 where two patch panels 10 are mounted one on top of the other, conical apertures 128 located on the lower flange 126 receive screws 129 which engage threaded receptacles 127 of tray 12 (see FIGS. 5 and 13A) for the purpose of attaching the connector panel 14 to the tray 12. The conical apertures 128 are shaped to receive flat headed fasteners 129 such that they do not interfere with adjacent panels on an equipment rack (as shown in FIG. 14) and to permit flat mounting on a wall.

The front panel is configured to mount on an industry standard rack size and mounting pattern. The panel shown in the drawings preferably occupies a single rack mount space having a standard height of approximately 1.75 inches. Trays and panels may also be configured in other sizes that occupy 2 or 3 rack spaces (having heights of approximately 3.5" and 5.25", respectively). The tray may be field assembled onto equipment racks with a continuous array of panels. Because of the way the trays hinge into place they must be added sequentially upwards, starting from the bottom panels as shown in FIG. 14. Significantly, the tray does not require additional rack space since it mounts within the confines of the front panel.

Panel mounting tabs 140 and 142 extend outwardly from opposing ends of the panel 14 and include two pairs of mounting slots 144 and 146. Slots 144 and 146 extend axially inwardly toward the center of the connector panel 14 and are sized to receive mounting fasteners (not shown) for mounting the patch panel 10 to a rack. Slots 144 and 146 may alternately be replaced with elongated holes with closed ends (not shown).

As best seen in FIG. 3, a plurality of rectangular apertures 150 are disposed through panel 14 for the purpose of receiving connector assemblies 122 (FIG. 1). Each aperture 150 has a pair of access areas 152 through which a tool (not shown) may be inserted for the purpose of removing the connector assemblies 122.

As depicted in FIGS. 3, 8, 9, 10 and 11, each connector assembly 122 is preferably molded of a flame retardant thermoplastic. Connector assemblies of this type are also disclosed in commonly assigned U.S. Pat. No. 5,228,869, which is incorporated herein by reference. The assembly comprises an outer face 158 which may include at least one connector 160, at least one insert 162 and a mounting portion 164. Preferably a pair of connectors 160 are provided and it will be appreciated that both may be of any suitable shape for connecting fiber optic cables. Connectors 160 are illustrated as the ST type developed by AT&T technologies and may be fastened to the connector assembly 122 by any suitable means such as by nuts 163. Caps 166 are provided for covering the connectors 160 and are preferably formed of a polymer which is relatively resilient. It will be understood that caps 166 function to, among other things, prevent optical radiation from inadvertently being discharged into an eye of an operator.

The outer face 158 of the connector assembly 122 includes a pair of rectangular cut portions 170 which, when the assembly is mounted, are disposed in juxtaposition with the access areas 152 of the paenl 14. Cut portions 170 function to provide for easy disassembly of the connector assembly 122 from the rectangular apertures 150.

Mounting portion 164 extends outwardly from the rear of the connector assembly 122 and comprises a pair of side engagement portions 180 and an upper and a lower surface 182. The side portions 180 and surfaces 182 are sized to fit within the rectangular slots 150 of the panel 14. The side engagement portions 180 each include a resilient locking tab 184 for snap locking the connector assembly 122 to the panel 14. The locking tab has a tapered outer surface 186 which terminates in a retaining portion 188. Disposed within the retaining portion 188 is a recess 190 which may be engaged by a suitable tool for removal of the assembly 122. Holes 194 are disposed in the side engagement portions 180 for the purpose of receiving cable ties for cable management. A rear surface 195 of the outer face 158 functions as a shoulder to retain the connector assembly thereagainst. When the connector assembly is slid into the panel 14, the inner surfaces of the rectangular aperture 150 engage the outer surface 186 of the locking tabs 184 forcing same inwardly. When such inner surfaces engage the retaining portion 188, the locking tabs 184 snap outwardly to hold the connector assembly within the rectangular aperture 150.

The outer face 158 preferably includes a pair of inserts 162 located near the upper edge thereof. Each insert 162 is located within a recess 200 which is generally rectangular in shape and communicates with a tubular port 202. The tubular port 202 allows instrument access for removal of the insert 162. As shown in FIGS. 12A, 12B and 12C, each insert 162 includes opposing front and back surfaces 204 and 206. A symbol 210 may be provided on front surface 204 and/or back surface 206. This symbol is illustrated as a computer terminal but it will be understood that any suitable symbol for the identification of a connector 160 may be utilized. Both surfaces 204 and 206 include chamfered edges 211 for snapping the inserts 162 into the recesses 200. Opposing ends 212 and 214 each include a pair of protrusions 216 which are mated with correspondingly shaped holes (not shown) that extend laterally from within the recess 200. Protrusions 216 function to provide a snaplock feature for the inserts 162 and to provide a pivot point about which the inserts 162 may rotate.

As previously discussed, the use of the tray/panel assembly of this invention is not restricted to optical fiber only. The couplers 122 or telecommunications connectors are available in a wide variety of configurations such that this product may be used for multimedia applications that require both copper (i.e., twisted pairs) and optical fiber in the same panel. The present invention thus defines a "telecommunications media tray" for "telecommunications cable".

Referring generally to FIGS. 1, 2 and 4 and in accordance with yet another important feature of the present invention, a splice tray 220 may be fastened to the tray 12. The splice tray 220 is preferably centrally located for allowing room for the fiber bundle 60 to be disposed thereabout in a proper radius to prevent excessive bending thereof as previously discussed. The splice tray 220 is also preferably releasably fastened to the tray and, to facilitate this, a threaded rod 223 is mounted in an upright direction in relation to the tray 12. A slot (not numbered) is disposed through the splice tray 220 and a wing nut 226 is provided for retaining the tray 220 on the tray 12.

The splice tray 220 is illustrated as a fusion tray, although, it will be understood that any suitable tray 220 may be employed. However, the tray 220 is preferably, a mechanical splice (not shown) or a fusion splice tray, and a fusion tray is shown and described herein for illustrational purposes only. The tray 220 includes a cover 230, a base 232 and a fusion splice holder 234. The cover 230 is preferably transparent and may be formed of a suitably durable plastic such as polycarbonate and includes angled sides 235 which provide for a snaplock fit over the base 232. Splice tray is commercially available and preferably is model series 50 and 38 manufactured by Ditel, Hickory N.C.

The base 232 is preferably formed of a metallic substance and comprises upturned edges 238 and cable engagement area 240. A rattle prevention fabric (not shown) may be adhesively applied to the lower edge of the base 232 and it will be appreciated is centrally located. Upturned edges 238 define a cavity wherethrough telecommunications cable 30 and/or 60 may pass. The cable engagement area 240 includes cable tabs 248 and apemares 250. The cable tabs 248 provide a means for retaining the fiber optic cable 30 thereon. The apertures 250 function to provide access for cable ties (not shown).

The fusion splice holder 234 includes a plurality of laterally spaced channels 254 which, it will be appreciated, correspond in number to the number of optical strands (not numbered) disposed within the bundle 60.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A retrofittable multimedia patch management system for telecommunication cables, said cables having a coil portion, a first end portion and a second end portion, comprising:
   tray means for supporting said coiled portion of said cables, said tray means including a bottom panel having a pair of opposed side edges and a rear edge, said tray being means being connectable to a front connector panel by interconnection of tab means extending from said tray means with receiving apertures defined by said front connector panel, said front connector panel having a plurality of rectangular apertures disposed therethrough; and
   a plurality of multimedia modular connector assemblies, each of said connector assemblies having means for snaplockedly mounting one of said connector assemblies within one of said rectangular apertures and each of said connector assemblies also having at least one telecommunications connector.

2. The device of claim 1, further including:
   means for splicing the cables releasably fastened to said tray means.

3. The device of claim 2, wherein said splicing means includes:
   a base having opposed upturned front and rear edges located thereon, said base also including a pair of opposed lateral edges, said pair of opposed lateral ends including a first end having an upturned edge and a second end including a cable mounting portion; and
   a splice holder located on said base.

4. The device of claim 3, wherein said splicing means further includes:
   a cover.

5. The device of claim 3, wherein said fiber optic cable mounting portion includes:
   a plurality of laterally spaced tabs.

6. The device of claim 3, wherein said splice holder includes: a plurality of channels to hold mechanical fusion splices.

7. The device of claim 1, wherein each of said connector assemblies includes:
   means for labeling said telecommunications connector.

8. The device of claim 7, wherein said connector assembly includes a from face and wherein:
   said front face has at least one recess disposed thereon; and
   said means for labeling said telecommunications connector includes a releasably mounted insert.

9. The device of claim 8, wherein said insert further includes: a pair of protrusions extending laterally from said insert; and chamfered edges.

10. The device of claim 1, wherein said tray means further comprises:
    a lug for retaining the cables thereon.

11. The device of claim 1, wherein:
    said tray means includes guide means, disposed within said tray means, for maintaining said coiled portions of said cables within a predetermined range of bending radius.

12. The device of claim 11, wherein said guide means includes:
    a plurality of retention clips, each of said clips including a longitudinally extending base, a first side wall extending upwardly from said base, a top hingeably-secured to said first side wall, a second side wall extending downwardly from said top, and means for snaplockedly securing said second side wall to said base, wherein said clips have a relative orientation to each other for defining said range of bending radius.

13. The device of claim 12, wherein said plurality of retention clips includes:
    four clips.

14. The device of claim 1, further comprising:
    top cover means for enclosing said tray means.

15. The device of claim 14, wherein said tray means includes:
    a plurality of tabs for supporting said top cover means, said plurality of tabs including a pair of tabs each having an aperture therethrough; and a mounting clip disposed on each of said tabs having a slot therethrough.

16. The device of claim 15, wherein said top cover means includes:
a pair of fasteners each adapted to releasably engage the slot of said mounting clips for mounting said top cover to said tray means.

17. The device of claim 1, wherein:
said at least one telecommunications assembly includes a pair of telecommunications connectors.

18. The device of claim 17, wherein said means for snaplockedly mounting one of said connector assemblies within one of said rectangular apertures includes:
a pair of side portions extending rearwardly from said front face and each having a tab, each of said tabs including a tapered portion and a retaining ledge.

19. The device of claim 1, wherein said tray means further comprises:
a rear wall extending perpendicularly upwardly from said rear edge of said bottom panel and an opposed pair of side walls extending perpendicularly upwardly from said respective side edges of said bottom panel.

20. The device of claim 1, further comprising:
a splice tray releasably mounted to said tray means.

21. The device of claim 1 wherein:
each of said side walls are disposed along a portion of each of said lateral edges and said rear wall is disposed along a portion of said rear edge to thereby define a pair of openings between said rear wall and each of said side walls.

22. The device of claim 1, wherein:
said telecommunications cables comprise fiber optic cables; and
said telecommunications connector comprises a fiber optic cable connector.

23. A retrofittable multimedia patch management system for telecommunication cables, said cables having a coil portion, a first end portion and a second end portion, comprising:
tray means for supporting said coiled portion of said cables, said tray means including a bottom panel having a pair of opposed side edges and a rear edge, said tray being means being connectable to a front connector panel by interconnection of tab means extending from said tray means with receiving apertures defined by said front connector panel, said front connector panel having a plurality of rectangular apertures disposed therethrough; and
a plurality of multimedia modular connector assemblies, each of said connector assemblies having means for snaplockedly mounting one of said connector assemblies within one of said rectangular apertures and each of said connector assemblies also having a least one telecommunications connector and each of said connector assemblies including means for labeling said telecommunications connector.

24. The device of claim 23, wherein:
said telecommunications cables comprise fiber optic cables; and
said telecommunications connector comprises a fiber optic cable connector.

* * * * *